(12) United States Patent
Kim et al.

(10) Patent No.: US 12,446,585 B2
(45) Date of Patent: Oct. 21, 2025

(54) ANTIBACTERIAL GLASS COMPOSITION AND MANUFACTURING METHOD THEREOF

(71) Applicant: LG ELECTRONICS INC., Seoul (KR)

(72) Inventors: Namjin Kim, Seoul (KR); Young Seok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 703 days.

(21) Appl. No.: 17/625,688

(22) PCT Filed: Jul. 9, 2020

(86) PCT No.: PCT/KR2020/009054
§ 371 (c)(1),
(2) Date: Jan. 7, 2022

(87) PCT Pub. No.: WO2021/006680
PCT Pub. Date: Jan. 14, 2021

(65) Prior Publication Data
US 2022/0272981 A1    Sep. 1, 2022

(30) Foreign Application Priority Data
Jul. 10, 2019    (KR) .................. 10-2019-0083497

(51) Int. Cl.
| | | |
|---|---|---|
| *A01N 59/20* | (2006.01) | |
| *A01N 59/06* | (2006.01) | |
| *A01N 59/14* | (2006.01) | |
| *A01N 59/16* | (2006.01) | |
| *A01P 1/00* | (2006.01) | |
| *C03B 7/094* | (2006.01) | |
| *C03C 3/066* | (2006.01) | |
| *C03C 3/078* | (2006.01) | |
| *C03C 3/083* | (2006.01) | |
| *C03C 3/089* | (2006.01) | |
| *C03C 3/093* | (2006.01) | |
| *C03C 3/115* | (2006.01) | |
| *C03C 3/118* | (2006.01) | |
| *C03C 4/00* | (2006.01) | |

(52) U.S. Cl.
CPC ............ *A01N 59/20* (2013.01); *A01N 59/06* (2013.01); *A01N 59/14* (2013.01); *A01N 59/16* (2013.01); *C03B 7/094* (2013.01); *C03C 3/066* (2013.01); *C03C 3/078* (2013.01); *C03C 3/083* (2013.01); *C03C 3/089* (2013.01); *C03C 3/093* (2013.01); *C03C 3/115* (2013.01); *C03C 3/118* (2013.01); *C03C 4/00* (2013.01); *A01P 1/00* (2021.08); *C03C 2204/02* (2013.01)

(58) Field of Classification Search
None
See application file for complete search history.

(56) References Cited

U.S. PATENT DOCUMENTS

| | | |
|---|---|---|
| 2009/0092680 A1 | 4/2009 | Slaghek et al. |
| 2014/0079807 A1 | 3/2014 | Borrelli et al. |
| 2015/0230476 A1 | 8/2015 | Bookbinder et al. |
| 2017/0172151 A1 | 6/2017 | Bookbinder et al. |
| 2018/0215655 A1 | 8/2018 | Kim et al. |
| 2018/0317496 A1 | 11/2018 | Bookbinder et al. |
| 2019/0092680 A1 | 3/2019 | Kim et al. |
| 2019/0169065 A1 | 6/2019 | Choi et al. |
| 2019/0373897 A1 | 12/2019 | Bookbinder et al. |

FOREIGN PATENT DOCUMENTS

| | | |
|---|---|---|
| CN | 103459338 A | 12/2013 |
| CN | 106536435 A | 3/2017 |
| JP | H10218641 A | 8/1998 |
| JP | H11228173 A | 8/1999 |
| JP | 2011-093769 A | 5/2011 |
| KR | 10-2014-0033028 A | 3/2014 |
| KR | 10-2016-0124193 A | 10/2016 |
| KR | 10-2018-0089988 A | 8/2018 |
| KR | 10-2019-0035173 A | 4/2019 |
| KR | 1020190066801 A | 6/2019 |

OTHER PUBLICATIONS

An internet article "Does the Microwave Kill Bacteria?" (published by Adrian Carter on May 28, 2018 and obtained from the website: https://hygienefoodsafety.org/does-microwave-kill-bacteria/ ).*
European Search Report from Appl'n No. 20 83 7155 dated Jun. 19, 2023.

* cited by examiner

*Primary Examiner* — Sin J Lee
(74) *Attorney, Agent, or Firm* — Bryan Cave Leighton Paisner LLP

(57) ABSTRACT

The present disclosure relates to an antibacterial glass composition and a manufacturing method thereof. The antibacterial glass composition according to the present disclosure comprises: 20-45 wt % of $SiO_2$; 1-30 wt % of $B_2O_3$; 10-30 wt % of ZnO; 5-25 wt % of one or more of $Na_2O$, $K_2O$ and $Li_2O$; 0.1-10 wt % of one or more of $Al_2O_3$ and $TiO_2$; 0.1-5 wt % of NaF; and 1-10 wt % of one or more of $Co_3O_4$, CuO and $Fe_2O_3$, thereby causing no deterioration in durability and ensuring excellent antibacterial activity.

12 Claims, No Drawings

ANTIBACTERIAL GLASS COMPOSITION AND MANUFACTURING METHOD THEREOF

CROSS-REFERENCE TO RELATED APPLICATION

This application is a National Stage Application of International Application No. PCT/KR2020/009054, filed on Jul. 9, 2020, which claims the benefit of and priority to Korean Patent Application No. 10-2019-0083497, filed on Jul. 10, 2019, which are hereby incorporated by reference in their entirety for all purposes as if fully set forth herein.

TECHNICAL FIELD

Disclosed herein are an antibacterial glass composition and a manufacturing method thereof that exhibits an antibacterial property.

BACKGROUND ART

Microorganisms such as germs, viruses and bacteria are found in all places, in particular, a washbasin, shelves in a fridge or a washing machine that are used in our daily life. When such microorganisms invade the human body, they can infect the human body and become a serious threat to human health. Under the circumstances, there is a growing need for an antibacterial glass composition capable of controlling the spread of microorganisms to the items such as a washbasin, shelves in a fridge, an oven, a washing machine, and the like that are used in everyday life.

In the related art, an antibacterial glass composition includes molybdenum oxide, to increase the number of positive hydrogen ions that are generated from moisture and the molybdenum oxide. The water-soluble medium creates an acid environment, and microorganisms are killed in the acid environment. However, the antibacterial glass composition including mono molybdenum oxide cannot ensure water resistance properly, and the acid environment needs to be created.

To ensure sufficient water resistance, an antibacterial glass composition includes compound oxide in which molybdenum and silver or molybdenum and copper are combined. However, in the antibacterial glass composition including the compound oxide, a ratio of molybdenum decreases. Accordingly, an acid environment of the water-soluble can hardly be created, causing deterioration of antibacterial activity.

Additionally, the antibacterial glass composition including the compound oxide, in which molybdenum and silver or molybdenum and copper are combined, can cause blood clots and cytotoxicity in the human body.

A high-cost component such as silver causes an increase in the manufacturing costs of an antibacterial glass composition.

An antibacterial glass composition including 50 wt % or greater of ZnO is widely known. However, in the antibacterial glass composition, ZnO only exhibits antibacterial activity, and the continuous extraction of Zn is a cause for concern. Further, the durability of the antibacterial glass composition can deteriorate.

DESCRIPTION OF INVENTION

Technical Problems

The objective of the present disclosure is to provide a novel silicate-based antibacterial glass composition that ensures excellent durability and antibacterial activity. In particular, the objective of the present disclosure is to provide a novel glass composition that ensures the durability and excellent antibacterial activity of the antibacterial glass composition even if the content of ZnO increases.

Technical Solutions

To achieve the above objectives, an antibacterial glass composition according to the present disclosure, includes 10-30 wt % of ZnO, and other components at properly controlled composition ratios.

An antibacterial glass composition according to the present disclosure includes 20-45 wt % of $Si_{O2}$, 1-30 wt % of $B_2O_3$; 10-30 wt % of ZnO; 5-25 wt % of one or more of $N_{a2}O$, $_{K2}O$ and $L_{i2}O$; 0.1-10 wt % of one or more of $A_{l2O3}$ and $Ti_{O2}$; 0.1-5 wt % of NaF; and 1-10 wt % of one or more of $C_{o3O4}$, CuO and $F_{e2O3}$, thereby causing no deterioration in durability and ensuring excellent antibacterial activity.

Advantageous Effects

An antibacterial glass composition according to the present disclosure may ensure excellent durability and antibacterial activity.

The antibacterial glass composition may be applied to a wide range of products as an all-purpose antibacterial agent.

The antibacterial glass composition may be manufactured cost-effectively since the antibacterial glass composition includes no high-cost component.

DETAILED DESCRIPTION OF EXEMPLARY EMBODIMENT

The above-described aspects, features and advantages are specifically described hereunder with reference to the accompanying drawings such that one having ordinary skill in the art to which the present disclosure pertains can easily implement the technical spirit of the disclosure. In the disclosure, detailed description of known technologies in relation to the disclosure is omitted if it is deemed to make the gist of the disclosure unnecessarily vague. Below, preferred embodiments according to the disclosure are specifically described.

Embodiments are not limited to the embodiments set forth herein and can be modified and changed in various different forms. The embodiments in the disclosure are provided such that the disclosure can be through and complete and the scope of the disclosure can be fully conveyed to one of ordinary skill in the art. Hereafter, an antibacterial glass composition and a manufacturing method thereof according to the present disclosure are specifically described.

<Antibacterial Glass Composition>

An antibacterial glass composition according to the present disclosure includes 20-45 wt % of $SiO_2$; 1-30 wt % of $B_2O_3$; 10-30 wt % of ZnO; 5-25 wt % of one or more of $Na_2O$, $K_2O$ and $Li_2O$; 0.1-10 wt % of one or more of $Al_2O_3$ and $TiO_2$; 0.1-5 wt % of NaF; and 1-10 wt % of one or more of $Co_3O_4$, CuO and $Fe_2O_3$.

The antibacterial glass composition is a novel silicate-based glass composition that ensures excellent durability and antibacterial activity. Hereafter, the components of the antibacterial glass composition according to the disclosure are described specifically.

$SiO_2$ is an essential component that forms a glass structure and serves as a skeleton of the glass structure. The antibacterial glass composition includes 20-45 wt % of $SiO_2$. When greater than 45 wt % of $SiO_2$ is included, viscosity increases when glass melts. Accordingly, workability may deteriorate during quenching. When less than 20 wt % of $SiO_2$ is included, the glass structure may be weaken, and water resistance may deteriorate.

$B_2O_3$ serves as a glass former together with $SiO_2$ such that a glass composition is vitrified.

Since $B_2O_3$ has a low melting point, $B_2O_3$ helps to vitrify the glass composition easily as well as lowering a eutectic point of a molten material. The antibacterial glass composition according to the disclosure includes 1-30 wt % of $B_2O_3$. When greater than 30 wt % of $B_2O_3$ is included, $B_2O_3$ interferes with content of the other components, resulting in deterioration in the antibacterial activity. When less than 1 wt % of $B_2O_3$ is included, the glass structure may be weaken, and the water resistance may decrease.

ZnO serves a mesh modifier as well as a mesh former in terms of the structure of glass. Additionally, ZnO is one of the main components that exhibit antibacterial activity in the composition of glass. The antibacterial glass composition according to the disclosure includes 10-30 wt % of ZnO. In the disclosure, content of ZnO increases to improve the antibacterial activity. An increase in the content of ZnO in the composition of glass causes deterioration in the durability of the glass composition. In the disclosure, the content of the other components are adjust to prevent deterioration in the durability. When less than 10 wt % of ZnO is included, the antibacterial activity of the glass composition may not be ensured. When greater than 30 wt % of ZnO is included, the durability or thermal property of the glass composition may deteriorate.

Alkali oxides such as $Na_2O$, $K_2O$, and $Li_2O$ perform cross-linking in the composition of glass and serve as a mesh modifier. Some of the components may not be vitrified solely, but vitrified when mixed with the mesh former such as $SiO_2$, $B_2O_3$ and the like at a predetermined ratio. When only one of the components described above is included in the glass composition, the durability of glass may deteriorate in an area in which vitrification is possible. When two or more of the components are included in the glass composition, the durability of glass may improve depending on a ratio. The antibacterial glass composition according to the disclosure includes 5-25 wt % of one or more of $Na_2O$, $K_2O$ and $Li_2O$. When greater than 25 wt % of one or more of $Na_2O$, $K_2O$ and $Li_2O$ is include, the thermal property of the glass composition may deteriorate. When less than 5 wt % of one or more of $Na_2O$, $K_2O$ and $Li_2O$ is included, hydrolysis of a component such as ZnO is hardly controlled, causing deterioration in the antibacterial activity.

The antibacterial glass composition according to the disclosure may include 3 wt % or less of $Li_2O$, for example. When greater than 3 wt % of $Li_2O$ is included, vitrification is hardly performed, and devitrification is highly likely to occur.

$Al_2O_3$ and $TiO_2$ improve the chemical durability, thermal property, and the like of glass. The antibacterial glass composition according to the disclosure includes 0.1-10 wt % of one or more of $Al_2O_3$ and $TiO_2$. When less than 0.1 wt % of one or more of $Al_2O_3$ and $TiO_2$ is included, the durability, and the like of glass may deteriorate. When greater than 10 wt % of one or more of $Al_2O_3$ and $TiO_2$ is included, devitrification may occur while glass melts.

NaF controls surface tension of glass and improves surface characteristics of a glass coating layer. The antibacterial glass composition according to the disclosure includes 0.1-5 wt % of NaF. When greater than 5 wt % of NaF is included, the thermal properties of glass may deteriorate. When less than 0.1 wt % of NaF is included, the surface characteristics of a glass coating layer may deteriorate.

$Co_3O_4$, CuO and $Fe_2O_3$ help glass itself to exhibit the antibacterial activity. Additionally, $Co_3O_4$, CuO and $Fe_2O_3$ allow of a chemical coupling between a low carbon steel substrate and glass to improve adhesion of a glass coating layer when the glass is used as a material for coating the substrate. The antibacterial glass composition according to the disclosure includes 1-10 wt % of one or more of $Co_3O_4$, CuO and $Fe_2O_3$. When less than 1 wt % of one or more of $Co_3O_4$, CuO and $Fe_2O_3$ is included, the antibacterial activity of glass may deteriorate. When greater than 10 wt % of one or more of $Co_3O_4$, CuO and $Fe_2O_3$ is included, the durability of glass may deteriorate.

The antibacterial glass composition may include 0.5 wt % or greater of $Co_3O_4$ and CuO respectively, for example. To improve the antibacterial activity and adhesion of the antibacterial glass composition equally, $Co_3O_4$ and CuO may all be included in the glass composition, for example.

<Manufacturing Method of Antibacterial Glass Composition>

Hereafter, a manufacturing method of an antibacterial glass composition according to the present disclosure is specifically described.

The manufacturing method of an antibacterial glass composition includes providing materials for an antibacterial glass composition; melting the materials for an antibacterial glass composition; and cooling the melted materials for an antibacterial glass composition in a quenching roller and forming an antibacterial glass composition.

The materials for an antibacterial glass composition sufficiently mix, and then melt. For example, the materials for an antibacterial glass composition may melt in a range of temperatures of 1000-1500° C. Additionally, the materials for an antibacterial glass composition may melt for 10-60 minutes.

Then the melted materials for an antibacterial glass composition may cool rapidly using a chiller and the like in the quenching roller. As a result, an antibacterial glass composition may be formed.

<Manufacturing of Antibacterial Coating Layer>

Then the antibacterial glass composition according to the disclosure may be coated on one surface of an object to be coated. The object to be coated may be part or all of a metallic plate, a tempered glass plate, and a cooking appliance. A spray method may be used in the coating process, but not limited.

The antibacterial glass composition may be burned in a range of temperatures of 700-750° C. for 300-450 seconds.

Hereafter, aspects according to the disclosure are specifically described with reference to embodiments.

Embodiments

<Manufacturing of Antibacterial Glass Composition>

Antibacterial glass compositions having composition ratios described in table 1 hereunder were manufactured. A raw material for each component was sufficiently mixed in a V-mixer for three hours. $Na_2CO_3$, $K_2CO_3$, and $Li_2CO_3$ were respectively used as a raw material for $Na_2O$, $K_2O$, and $Li_2O$. The rest components are described in table 1. The mixed materials melted sufficiently at 1300° C. for 30 minutes, and rapidly cooled in the quenching roller, to obtain a glass cullet.

To manufacture an antibacterial glass composition, initial granularity of the glass cullet obtained in the above processes was controlled with a ball mill, was ground for about five hours using a jet mill, and then passed through a 325 mesh sieve (ASTM C285-88) such that a particle diameter of the glass cullet was limited to 45 μm or less.

TABLE 1

| Component | Embodiment 1 | Embodiment 2 | Embodiment 3 | Comparative example 1 | Comparative example 2 |
|---|---|---|---|---|---|
| SiO2 | 26.25 | 28.27 | 28.27 | 47.02 | 60.32 |
| B2O3 | 27.1 | 23.58 | 23.58 | 5.88 | 12.1 |
| Na2O | 11.6 | 11.9 | 11.9 | 11.75 | 13.25 |
| K2O | 5.9 | 5.88 | 5.88 | 5.95 | 0 |
| Li2O | 2.28 | 2.2 | 2.2 | 2.3 | 1.8 |
| Al2O3 | 0.1 | 1.67 | 1.30 | 0 | 0.1 |
| ZrO2 | 0 | 0 | 0 | 0 | 2.2 |
| TiO2 | 0 | 0 | 0.37 | 23.8 | 2.2 |
| ZnO | 19.5 | 21.1 | 21.1 | 0 | 0 |
| CaO | 0 | 0 | 0 | 0 | 1.53 |
| NaF | 3.27 | 2.8 | 2.8 | 3.3 | 2.2 |
| Co3O4 | 2.4 | 1.9 | 1.9 | 0 | 1.6 |
| CuO | 0.8 | 0.7 | 0.7 | 0 | 0 |
| Fe2O3 | 0.8 | 0 | 0 | 0 | 0 |
| NiO | 0 | 0 | 0 | 0 | 1.3 |
| MnO2 | 0 | 0 | 0 | 0 | 1.4 |

<Manufacturing of Sample of Antibacterial Glass Composition>

The antibacterial glass compositions in the embodiments and comparative examples were sprayed onto a low carbon steel sheet (200 mm×200 mm) having a thickness of 1 mm or less with a corona discharge gun. A voltage of the corona discharge gun was controlled in a range of 40-100 kV. An amount of the antibacterial glass composition sprayed onto the low carbon steel sheet was 300 g/m$^2$. The antibacterial glass composition was burned in a range of temperatures of 700-750° C. for 300-450 seconds, and finally, a sample having a coating layer was manufactured.

Experimental Example

The antibacterial activity of the samples in the embodiments and comparative examples was evaluated as follows.

To ascertain the antibacterial ability of the coating layer, the antibacterial activity measurements against *Staphylococcus aureus* and *Escherichia coli* was measured using the JIS Z 2801 method (a standard test for antibacterial activity) that is a film attachment method. The antibacterial activity measurements are ordinarily 2.0 or greater, and is converted with respect to 99% of the antibacterial ability. The conversion method is specifically described as follows.

TABLE 2

| Antibacterial activity measurement | Antibacterial ability |
|---|---|
| 2.0 or greater | 99.0% |
| 3.0 or greater | 99.9% |
| 4.0 or greater | 99.99% |

As shown in table 3, the embodiments in the disclosure exhibit excellent antibacterial activity. The antibacterial activity of comparative example 1 is inferior to the antibacterial activities of the embodiments. In comparative example 2, the coating layer separated from the substrate since a thermal expansion coefficient of the coating layer does not match a thermal expansion coefficient of a base material of the substrate. Thus, it was impossible to measure the antibacterial activity of comparative example 2.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

The invention claimed is:

1. An antibacterial glass composition, comprising:
   20-45 wt % of SiO$_2$;
   1-30 wt % of B$_2$O$_3$;
   10-30 wt % of ZnO;
   5-25 wt % of one or more of Na$_2$O, K$_2$O and Li$_2$O;
   0.1-10 wt % of one or more of Al$_2$O$_3$ and TiO$_2$;
   0.1-5 wt % of NaF; and
   1-10 wt % of two or more of Co$_3$O$_4$, CuO and Fe$_2$O$_3$,
   wherein the antibacterial glass composition comprises Co$_3$O$_4$ and CuO.

2. The antibacterial glass composition of claim 1, wherein the antibacterial glass composition comprises 3 wt % or less of Li$_2$O.

3. The antibacterial glass composition of claim 1, wherein the antibacterial glass composition comprises Co$_3$O$_4$ and CuO, each in the amount of 0.5 wt % or greater.

TABLE 3

| Antibacterial activity measurement | Embodiment 1 | Embodiment 2 | Embodiment 3 | Comparative example 1 | Comparative example 2 |
|---|---|---|---|---|---|
| *Staphylococcus aureus* | 4.6 | 4.6 | 4.6 | 1.8 | Impossible to measure |
| *Escherichia coli* | 6.2 | 6.2 | 6.2 | 0.7 | Impossible to measure |

4. A manufacturing method of an antibacterial glass composition, comprising:
- mixing materials for the antibacterial glass composition, the antibacterial glass composition comprising: 20-45 wt % of $SiO_2$; 1-30 wt % of $B_2O_3$; 10-30 wt % of ZnO; 5-25 wt % of one or more of $Na_2O$, $K_2O$ and $Li_2O$; 0.1-10 wt % of one or more of $Al_2O_3$ and $TiO_2$; 0.1-5 wt % of NaF; and 1-10 wt % of two or more of $Co_3O_4$, CuO and $Fe_2O_3$, wherein the antibacterial glass composition comprises $Co_3O_4$ and CuO;
- melting the materials for the antibacterial glass composition; and
- cooling the melted materials for the antibacterial glass composition in a quenching roller, and forming the antibacterial glass composition.

5. The manufacturing method of claim 4, wherein the antibacterial glass composition comprises 3 wt % or less of $Li_2O$.

6. The manufacturing method of claim 4, wherein the antibacterial glass composition comprises $Co_3O_4$ and CuO, each in the amount of 0.5 wt % or greater.

7. The manufacturing method of claim 4, comprises melting the materials for the antibacterial glass composition at a temperature range of 1000-1500° C.

8. The manufacturing method of claim 7, comprises melting the materials for the antibacterial glass composition for 10-60 minutes.

9. The manufacturing method of claim 4, further comprises coating the antibacterial glass composition on one surface of an object.

10. The manufacturing method of claim 9, comprises burning the coated antibacterial glass composition at a temperature range of 700-750° C.

11. The manufacturing method of claim 10, comprises burning the coated antibacterial glass composition for 300-450 seconds.

12. The manufacturing method of claim 4, comprises forming the antibacterial glass composition into particles having a diameter of 45 μm or less.

\* \* \* \* \*